United States Patent
Ho et al.

(10) Patent No.: US 12,015,934 B2
(45) Date of Patent: *Jun. 18, 2024

(54) DYNAMICALLY LAYERED BEAMFORMED SIGNALS FOR FIFTH GENERATION (5G) WIRELESS COMMUNICATION SYSTEMS OR OTHER NEXT GENERATION WIRELESS COMMUNICATION SYSTEMS

(71) Applicant: AT&T Mobility II LLC, Atlanta, GA (US)

(72) Inventors: Ming-Ju Ho, Alpharetta, GA (US); Effendi Jubilee, Gaithersburg, MD (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,607

(22) Filed: Dec. 16, 2022

(65) Prior Publication Data
US 2023/0119643 A1 Apr. 20, 2023

Related U.S. Application Data

(63) Continuation of application No. 17/308,127, filed on May 5, 2021, now Pat. No. 11,533,638.

(51) Int. Cl.
*H04W 16/28* (2009.01)
*H04B 7/0408* (2017.01)
*H04B 7/10* (2017.01)

(52) U.S. Cl.
CPC .......... *H04W 16/28* (2013.01); *H04B 7/0408* (2013.01); *H04B 7/10* (2013.01)

(58) Field of Classification Search
CPC ....... H04W 16/28; H04B 7/0408; H04B 7/10; H04B 7/0617; H04B 7/0695
See application file for complete search history.

(56) References Cited

U.S. PATENT DOCUMENTS 11,533,638 B2 * 12/2022 Ho ........................... H04B 7/10
2018/0132252 A1    5/2018 Islam et al.
(Continued)

OTHER PUBLICATIONS

Office Action dated Apr. 20, 2022 for U.S. Appl. No. 17/308,127, 25 pages.
(Continued)

*Primary Examiner* — Kenneth T Lam
(74) *Attorney, Agent, or Firm* — GUNTIN & GUST, PLC; Dana Lemoine

(57) ABSTRACT

The technologies described herein are generally directed to using dynamically layered beamformed control signals in a fifth generation (5G) network or other next generation networks. For example, a method described herein can include, identifying a group of different directions radiating from beamforming antenna equipment of base station equipment. The method can further include facilitating transmitting a first beamformed signal according to a first direction of the group of different directions. Further, the method can include facilitating transmitting a second beamformed signal according to a second direction of the group of different directions, with the second direction being selected based on a sequence of directions, and where transmitting beamformed signals to the group of different directions is based on the sequence of directions can facilitate establishment of wireless coverage for a corresponding geographic area.

20 Claims, 13 Drawing Sheets

(56) References Cited

U.S. PATENT DOCUMENTS

| | | |
|---|---|---|
| 2018/0138962 A1 | 5/2018 | Islam et al. |
| 2019/0254064 A1 | 8/2019 | Islam et al. |
| 2019/0281574 A1 | 9/2019 | Reial et al. |
| 2020/0015258 A1 | 1/2020 | Zhou et al. |
| 2020/0037366 A1 | 1/2020 | Cui |
| 2021/0058140 A1 | 2/2021 | Schwab et al. |
| 2021/0194561 A1 | 6/2021 | Bai et al. |
| 2022/0015146 A1 | 1/2022 | Rune et al. |

OTHER PUBLICATIONS

Notice of Allowance dated Aug. 17, 2022 for U.S. Appl. No. 17/308,127, 29 pages.

* cited by examiner

600 ⬈

```
                                    ┌─ 610                              ┌─ 630
         for r = 1:2^(Control_Layers-1)
            for t = 1:Control_Layers
                beamwidth = 1/2^(t-1) * 100;   %%% percentage
                if t == 1        ┌─ 615
                    modulo_x = 1;
                    beam_position = 1;
                else
                    modulo_x = 2^(t-1);
                    beam_position = mod(beam_position*2+r,modulo_x);
                    if beam_position == 0
                        beam_position = modulo_x;
                    end
                end
                rp=rp+1;
LOOP            fprintf('rp =%d; r=%d; t=%d; modulo=%d; beamwidth=%f;
620     beamshape=(%d,%d)\n',rp,r,t,modulo_x,beamwidth,t,beam_position);
            end
         end
```

FIG. 6

DYNAMICALLY LAYERED BEAMFORMED SIGNALS FOR FIFTH GENERATION (5G) WIRELESS COMMUNICATION SYSTEMS OR OTHER NEXT GENERATION WIRELESS COMMUNICATION SYSTEMS

RELATED APPLICATION

The subject patent application is a continuation of, and claims priority to, U.S. patent application Ser. No. 17/308,127, filed May 5, 2021, and entitled "DYNAMICALLY LAYERED BEAMFORMED SIGNALS FOR FIFTH GENERATION (5G) WIRELESS COMMUNICATION SYSTEMS OR OTHER NEXT GENERATION WIRELESS COMMUNICATION SYSTEMS," the entirety of which priority application is hereby incorporated by reference herein.

TECHNICAL FIELD

The subject application is related to implementation of fifth generation (5G) wireless communication systems or other next generation wireless communication systems, and, for example, different approaches to using beamformed signals.

BACKGROUND

As wireless network implementations have continued to increase in complexity and requirements, different technologies have been used to improve the performance and efficiency of wireless communications between base station equipment and user equipment. Problems can occur however, when fixed beam shapes are used for communicating with user equipment, e.g., because when some conventional approaches broadcast in many directions without pause, efficiency can suffer. Also, for certain types of beams, e.g., control beams, fixed beam shapes can cause interference when multiple devices detect the same signal for communication.

As the use of multiple input multiple output (MIMO) antenna arrays increases, using conventional approaches to efficiently allocate beam resources to devices and avoid interference between devices is becoming increasingly complicated.

BRIEF DESCRIPTION OF THE DRAWINGS

The technology described herein is illustrated by way of example and not limited in the accompanying figures in which like reference numerals indicate similar elements and in which:

FIG. 6 is a non-limiting example of computer program code that can be used to implement one or more embodiments described herein.

DETAILED DESCRIPTION

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate using dynamically layered beamformed signals for establishing wireless connections with network equipment. Different examples that describe these aspects are included with the description of FIGS. 1-12 below. It should be noted that the subject disclosure may be embodied in many different forms and should not be construed as limited to this example or other examples set forth herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate using dynamically layered beamformed signals for establishing wireless connections with network equipment. It should be noted that the subject disclosure may be embodied in many different forms and should not be construed as limited to this example or other examples set forth herein.

The above-described background relating to network hardware is merely intended to provide a contextual overview of some current issues, and is not intended to be exhaustive. Other contextual information may become further apparent upon review of the following detailed description.

Figure 1:
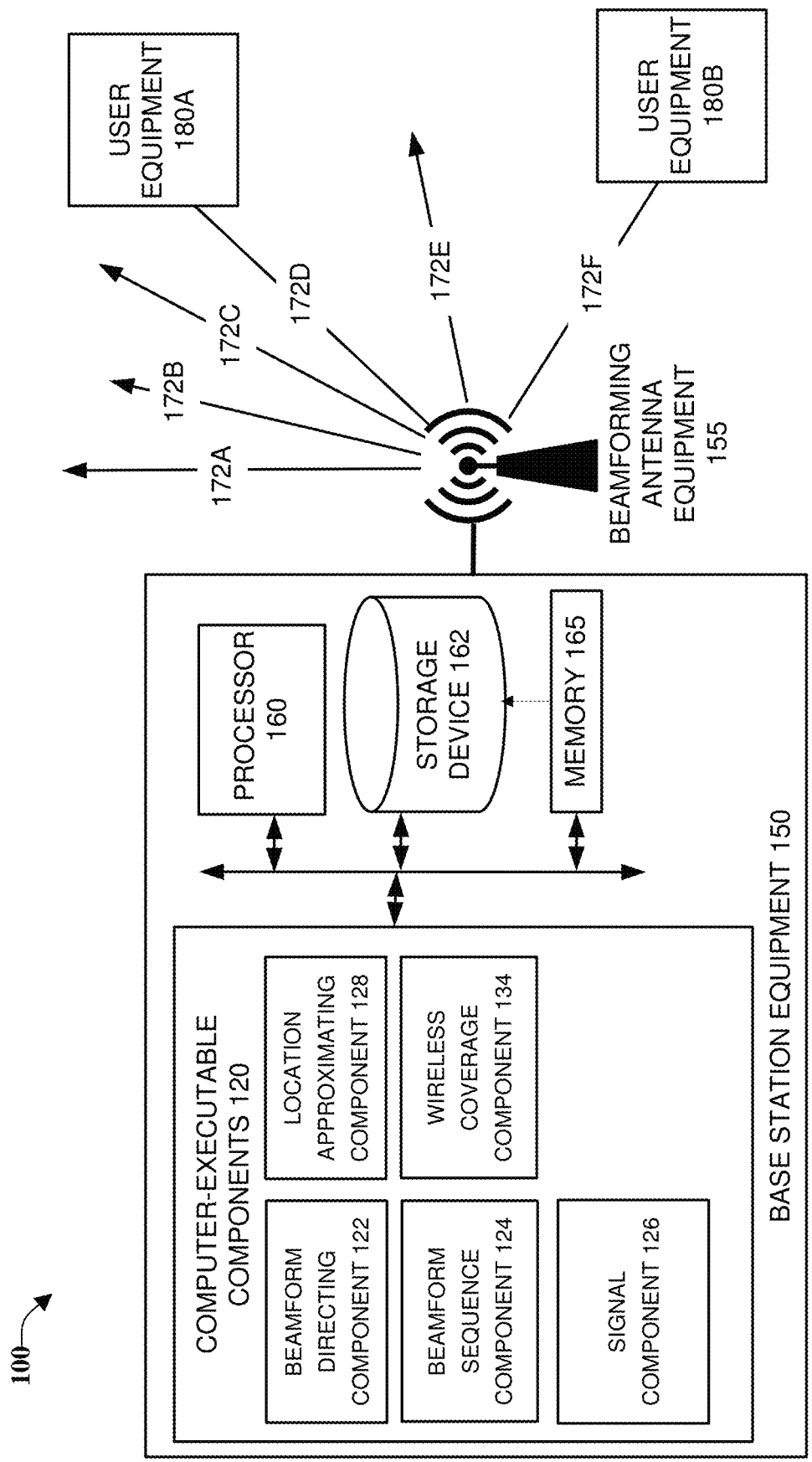
FIG. 1 is an architecture diagram of an example system that can facilitate base station equipment using dynamically layered beamformed control signals for establishing wireless connections with user equipment, in accordance with one or more embodiments.

FIG. 1 is an architecture diagram of an example system 100 that can facilitate base station equipment using dynamically layered beamformed signals for establishing wireless connections with user equipment, in accordance with one or more embodiments. For purposes of brevity, description of like elements and/or processes employed in other embodiments is omitted. It should be noted that, although many examples herein discuss utilizing beamformed signals in a fifth generation (5G) or other next generation wireless communication systems, one having skill in the relevant art(s), given the description herein would appreciate that the approaches can also apply to other types of network, e.g., long term evolution (LTE) networks.

One or more embodiments can address problems such as those described in the Background section above with inventive concepts that include different approaches to increasing efficiency and reducing interference for control beam uses. For example, one or more embodiments provide a transmission protocol for a dynamic and layered broadcast/control beam.

One or more embodiments can transmit beamformed control beams toward different directions at different times, at different intervals, with sequences of directions selected for implementations depending on different factors, including, but not limited to, coverage area, minimum efficiency, and acceptable interference levels. As described further below, one or more embodiments can increase efficiency based on transmission toward fewer directions simultaneously than conventional broadcasting approaches to providing control signals. As described further below, one or more embodiments can further use this transmission toward fewer directions simultaneously to reduce interference between user equipment, e.g., by enabling different user equipment at different locations surrounding a base station to detect different beamformed control beams at different times. Additional embodiments can further promote these advantages by dynamically using different types of broadcast/control beam shapes, e.g., from narrow to wide/full, depending on implementation specifics.

As depicted, system 100 can include base station equipment 150 communicatively coupled to user equipment 180A-B via beamforming antenna equipment 155. In one or more embodiments, base station equipment 150 can include computer executable components 120, processor 160, storage device 162, and memory 165.

Computer executable components 120 can include beamform directing component 122, beamform sequence component 124, signal component 126, location approximating component 128, wireless coverage component 134, and other components described or suggested by different embodiments described herein that can improve the operation of system 100. It is noted that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, base station equipment 150 can further comprise various computer and/or computing-based elements described herein with reference example program code provided with FIG. 7 for operating environment 1200 and FIG. 12.

According to multiple embodiments, network 190 can comprise, but are not limited to, wired and wireless networks, including, but not limited to, a cellular network, a wide area network (WAN) (e.g., the Internet) or a local area network (LAN). For example, system 100 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1206 and FIG. 12. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1204 of FIG. 12. Such examples of processor 160 can be employed to implement any embodiments of the subject disclosure.

According to multiple embodiments, base station equipment 150 can include memory 165 that can store one or more computer and/or machine readable, writable, and/or executable components and/or instructions 120 that, when respectively executed by processor 160, can facilitate performance of operations defined by the executable component(s) and/or instruction(s).

Generally, applications (e.g., computer executable components 120) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, handheld computing devices, microprocessor-based or programmable consumer electronics, and the like, each of which can be operatively coupled to one or more associated devices It should be appreciated that the embodiments of the subject disclosure depicted in various figures disclosed herein are for illustration only, and as such, the architecture of such embodiments are not limited to the systems, devices, and/or components depicted therein. For example, in some embodiments, base station equipment 150 can further comprise various computer and/or computing-based elements described herein with reference to operating environment 1200 and FIG. 12. In one or more embodiments, such computer and/or computing-based elements can be used in connection with implementing one or more of the systems, devices, components, and/or computer-implemented operations shown and described in connection with FIG. 1 or other figures disclosed herein.

For example, in one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining beamform directing component 122. For example, in one or more embodiments, beamform directing component 122 can, in accordance with one or more embodiments, identify a group of different directions 172A-F radiating from beamforming antenna equipment 155 of base station equipment 150.

In addition, beamform directing component 122 can further, in accordance with one or more embodiments, facilitate transmitting a first beamformed signal directed by beamforming antenna equipment 155 according to direction 172A of the group of different directions 172A-F.

As discussed further with FIGS. 5-6 below, in another example, computer executable components 120 can include instructions that, when executed by processor 160, can facilitate performance of operations defining beamform sequence component 124. For example, in one or more embodiments, beamform sequence component 124 can, in accordance with one or more embodiments, facilitate transmitting a second beamformed signal directed by the beamforming antenna equipment 155 according to a second direction 172B of the group of different directions 172A-F, wherein the second direction was selected based on a sequence of directions, and wherein transmitting of beamformed signals to respective ones of the group of different directions based on the sequence of directions facilitates establishment of wireless coverage by at least some of the base station equipment for a corresponding geographic area. Different sequences of beam characteristics and directions are discussed with FIGS. 3-5 below.

As discussed further with FIG. 5 below, in a variation of embodiments described above, in one or more embodiments, computer executable components 120 can include instructions that, when executed by processor 160, can facilitate performance of operations defining wireless coverage component 134. In one or more embodiments, wireless coverage component 134 can, in accordance with one or more embodiments, transmit the first beamformed signal until the expiration of a time interval, with the transmitting of the second beamformed signal commencing in response to the expiration of the time interval.

In another example, in one or more embodiments, computer executable components 120 can include instructions that, when executed by processor 160, can facilitate performance of operations defining signal component 126. For example, in one or more embodiments, signal component 126 can, in accordance with one or more embodiments, receive from user equipment 180A, a confirmation signal corresponding to a confirmation that the user equipment acquired the first broadcast control beam beamformed toward direction 172D.

In another example, in one or more embodiments, computer executable components 120 can include instructions that, when executed by processor 160, can facilitate performance of operations defining location approximating component 128. For example, in one or more embodiments, location approximating component 128 can, in accordance with one or more embodiments, based on direction 172D, determine an approximate geographic location of the user equipment in relation to beamforming antenna equipment 155 and base station equipment 150.

In another example, in one or more embodiments, signal component 126 can further, in accordance with one or more embodiments, based on the approximate geographic location determined by location approximating component 128, facilitate, by the system, establishing a specific beamformed signal directed to user equipment 180A.

It should be noted that, in one or more embodiments, system 100 and other embodiments described herein can employ hardware and/or software to solve problems that are highly technical in nature, including improving the process of simultaneously establishing directed, beamformed communications with multiple network devices. One having skill in the relevant art(s), given the disclosure herein, would appreciate that the technical problems that can be solved by one or more embodiments described herein are not abstract and cannot be performed as a set of mental acts by a human.

Further, in certain embodiments, some of the processes performed can be performed by one or more specialized computers (e.g., one or more specialized processing units, a specialized computer such as tomography and reconstruction, statistical estimation, specialized routing analysis, and so on) for carrying out defined tasks related to using dynamically layered beamformed signals for establishing wireless connections with network equipment. System 100 and/or components of system 100 and other systems described herein, can be employed to solve new problems that arise through advancements in technologies mentioned above, computer architecture, and/or the like.

The above-described background relating to network hardware is merely intended to provide a contextual overview of some current issues, and is not intended to be exhaustive. Other contextual information may become further apparent upon review of the following detailed description.

In an example embodiment, one or more embodiments can augment the transmission of common channel information from base station equipment to user devices in a cell to establish communications channels in different circumstances. This common channel information can include information regarding broadcast channels available, primary and secondary synchronization, control channels, beam/layer specific reference signals, UE handover, and other control channels, e.g., information in Master Information Blocks (MIBs), and System Information Blocks (SIBs) facilitating the utilization of Resource Blocks (RBs) for established connections.

After acquiring a control beam transmitted by one or more embodiments, base station equipment and UE can establish a connection. In one or more embodiments, appropriate traffic/user beams can be searched and identified based on traffic/user beam allocation approaches discussed herein. Notwithstanding the establishing of communications channels that are similar to other approaches, it is noted that, as discussed further below, one or more embodiments are different at least, from approaches where a control beam is transmitted from antenna equipment using an omnidirectional, broadcast approach.

As discussed with FIGS. 3-5 below, one or more embodiments describe aspects of approaches where control beam signals are broadcast by base station equipment 150 for receipt by user equipment 180A for establishing connections with base station equipment 150. In contrast to other approaches, instead of broadcasting connection establishing control signals, one or more embodiments can dynamically layer beamformed control signals in a more efficient approach with less interference among user equipment 180A-B. It is noted that, although several examples described herein discuss dynamically layered control signals, other signals can also utilize this approach in a similar fashion, resulting in similar benefits, e.g., higher efficiency and less signal interference.

Figure 2:
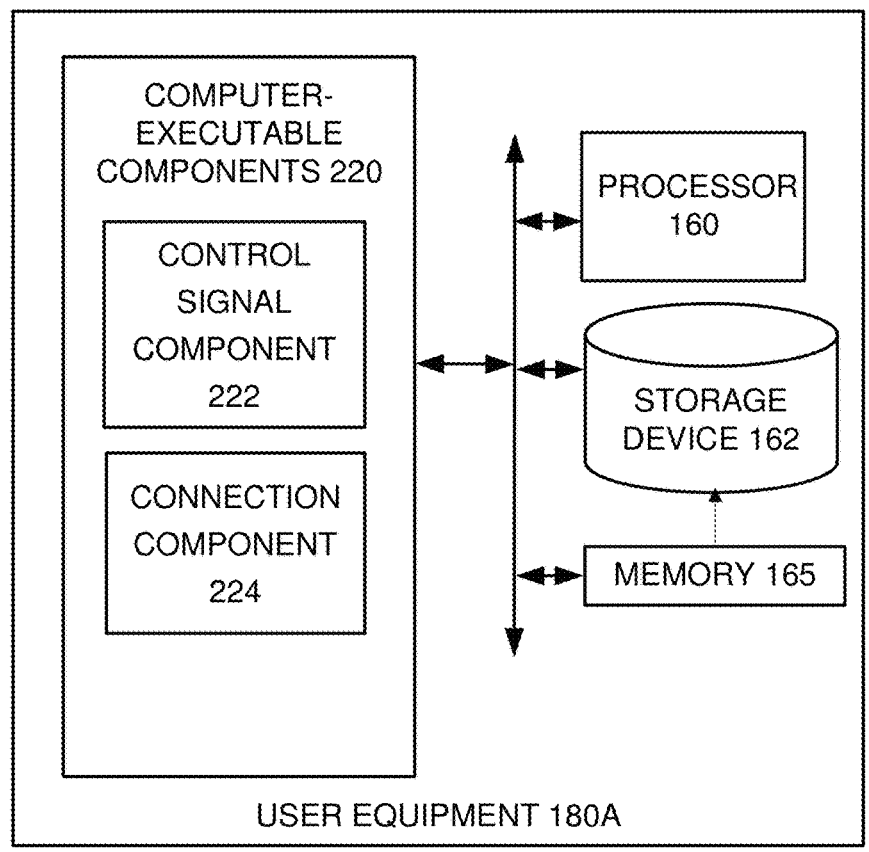
FIG. 2 is a diagram of a non-limiting example system that can facilitate using dynamically layered beamformed control signals for establishing wireless connections with network equipment, in accordance with one or more embodiments.

FIG. 2 is a diagram of a non-limiting example system 200 that can facilitate using dynamically layered beamformed signals for establishing wireless connections with network equipment, in accordance with one or more embodiments. For purposes of brevity, description of like elements and/or processes employed in other embodiments is omitted.

According to multiple embodiments, user equipment 180A can include memory 165 that can store one or more computer and/or machine readable, writable, and/or executable components and/or instructions 220 that, when respectively executed by processor 160, can facilitate performance of operations defined by the executable component(s) and/or instruction(s).

Generally, applications (e.g., computer executable components 220) can include routines, programs, components, data structures, etc., that perform particular tasks or implement particular abstract data types. In system 200, computer executable components 220 can include control signal component 222, connection component 224, and other components described or suggested by different embodiments described herein that can improve the operation of system 200. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, user equipment 180A can further comprise various computer and/or computing-based elements described herein with reference to operating environment 1200 and FIG. 12.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 160, can facilitate performance of operations defining control signal component 222. For example, in one or more embodiments, control signal component 222 can acquire a beamformed control signal from base station equipment 150. In some embodiments, based on the beamformed control signal, connection component 224 can establish a connection with the base station.

In additional embodiments the instructions can further facilitate using connection component 224 to receive, from the base station, a beamformed signal from direction 172D, for the connection directed to the network equipment based on an approximate geographic location of the network equipment. As described with FIG. 1 above, the approximate geographic location can have been determined by base station equipment 150 based on direction 172D of the beamformed control signal and the beamformed control signal acquired by the user equipment 180A, e.g., when UE 180A receives a beamformed beam from base station equipment 150, it can be identified, with accuracy based on the beam width of the beamformed beam that is toward direction 172D, in approximately which direction UE 180A is located. One having skill in the relevant art(s), give the descriptions herein, appreciates that this direction can be combined with other available information (e.g., signal strength of the response signal from UE 180A) to provide an approximate geographic location of UE 180A.

Benefits of the above-described determination of an approximate location for a UE include the speed with which this location can be approximated, e.g., at the point the connection is made based on a particular beam. With rapid approximation of location, additional benefits can accrue from the rapid selection of beamformed traffic/user beams for use with the connection to the UE, e.g., rapidly selected, narrow beamforms can both increase performance and reduce interference, in some circumstances.

Figure 3:
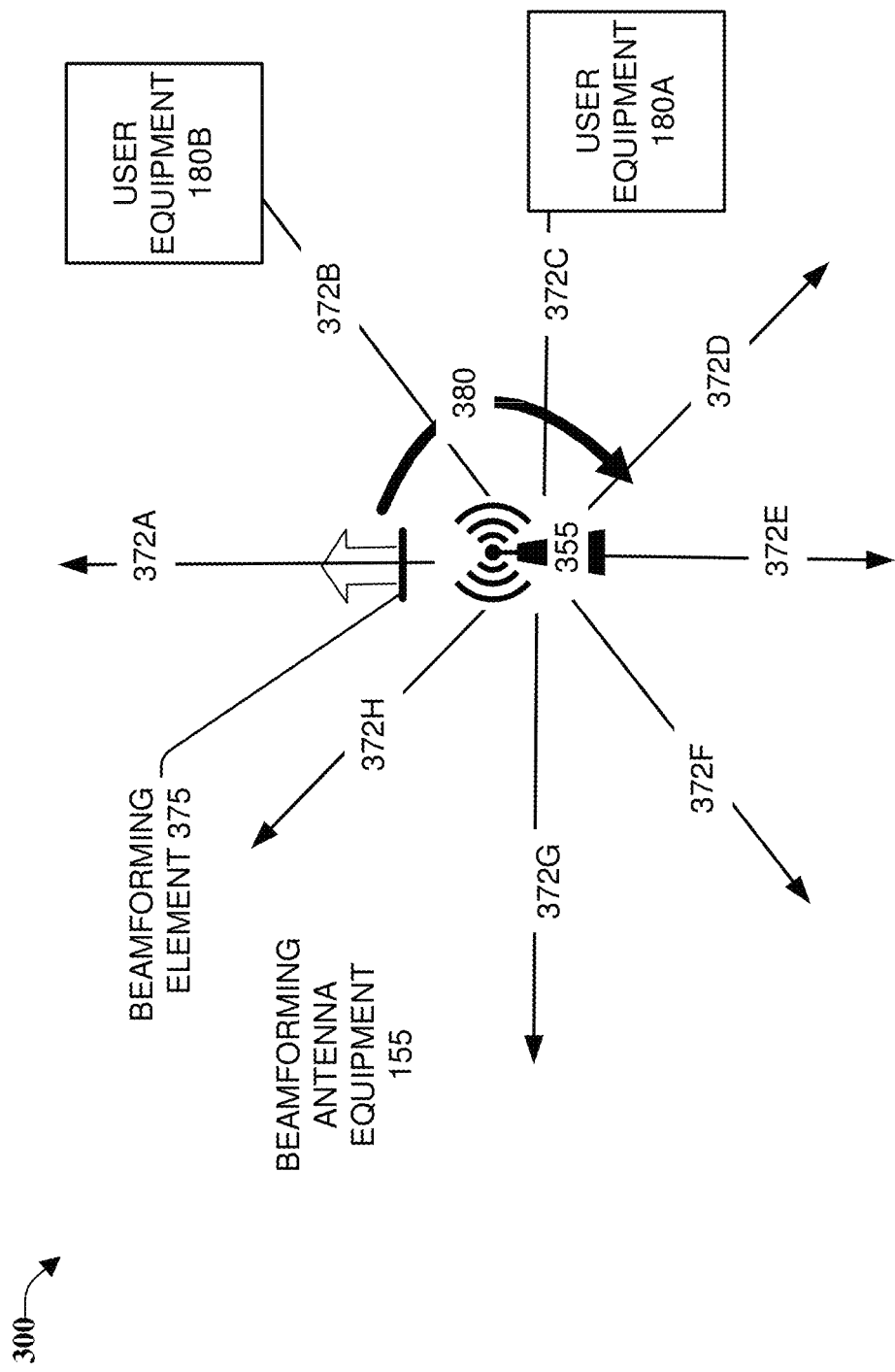
FIG. 3 is a diagram of a non-limiting example system that can facilitate using dynamically layered beamformed signals for establishing wireless connections with network equipment, in accordance with one or more embodiments.

FIG. 3 is a diagram of a non-limiting example system 300 that can facilitate using dynamically layered beamformed signals for establishing wireless connections with network equipment, in accordance with one or more embodiments. For purposes of brevity, description of like elements and/or processes employed in other embodiments is omitted.

In one or more embodiments, beamform sequence component 124 can facilitate transmitting by beamforming equipment 375, beamformed signals to one or more combinations of beam directions 372A-H, e.g., with each beam direction 372A-H having beamforming equipment similar to beamforming equipment 375. It should be noted that, for some embodiments, a layered approach to beamforming refers to combining beamformed signals to achieve coverage in specific directions, e.g., a first layer can combine all of beam directions 372A-H simultaneously, such that the span from beam directions 372A-H are covered with beamformed signals, e.g., 360 degrees around base station equipment 355, using beamforming equipment 375 for respective directions. A second layer can divide beam directions 372A-H into two combinations, e.g., 372A-D and 372E-H, e.g., 180 degrees for each combination of beam directions.

In one or more embodiments, a third layer can combine two directions at a time, thereby simultaneously beamforming in one of four combinations of directions, e.g., beamforming elements 375 being combined to beam to beam directions 372A-B, 372C-D, 372E-F, and 372G-H. A fourth layer can utilize one direction at a time, e.g., with coverage for beam directions 372A-H individually.

As described further with FIG. 4 below, one or more embodiments can activate beamforming elements in a sequence 380, e.g., for example layer three described above, a combination of beamforming elements 375 can first be activated for beam directions 372A-B, then the equipment is deactivated, and the next combination of directions (e.g., 372C-D) can be activated, according to sequence 380.

It should be noted that, while example beam directions 372A-H are depicted as regularly spaced in FIG. 3, this depiction is non-limiting, and other embodiments can divide the 360 degrees or fewer degrees surrounding beamforming antenna equipment 155 with regularly or irregularly spaced beamforming directions. As will be appreciated by one having skill in the relevant art(s), given the description herein, beamformed signals from beamforming antenna equipment can have beams that can have different beamwidths. As will be discussed with FIG. 5 below, in one or more embodiments, each example layer can have beams transmitted at different widths, e.g., with layer 4 having the narrowest beamwidth, and layers 3, 2, and 1 having incrementally larger beamwidths.

In one or more embodiments, different implementation parameters can be altered based on certain circumstances, including, but not limited to, numbers of control layers, period of time for each direction of a control layer to be beamformed, and other factor affecting the pattern of transmission of different signals. Different information that can be used, in real-time, or from historical data, can include but are not limited to channel condition information, such as UE measurement reports with information corresponding to Channel Quality Indicators (CQIs); precoding matrix indicators (PMIs), and Customer Information Queries (CIQs). For example, when CQIs receive by base station equipment from UEs indicate that interference is a potential problem between user equipment, one or more embodiments can adjust parameters to potentially reduce this interference, e.g., reducing beam widths for one or more of the dynamic layers discussed above, e.g., FIG. 5 describes dynamic adjustment of beam widths in one or more embodiments.

Figure 4A:
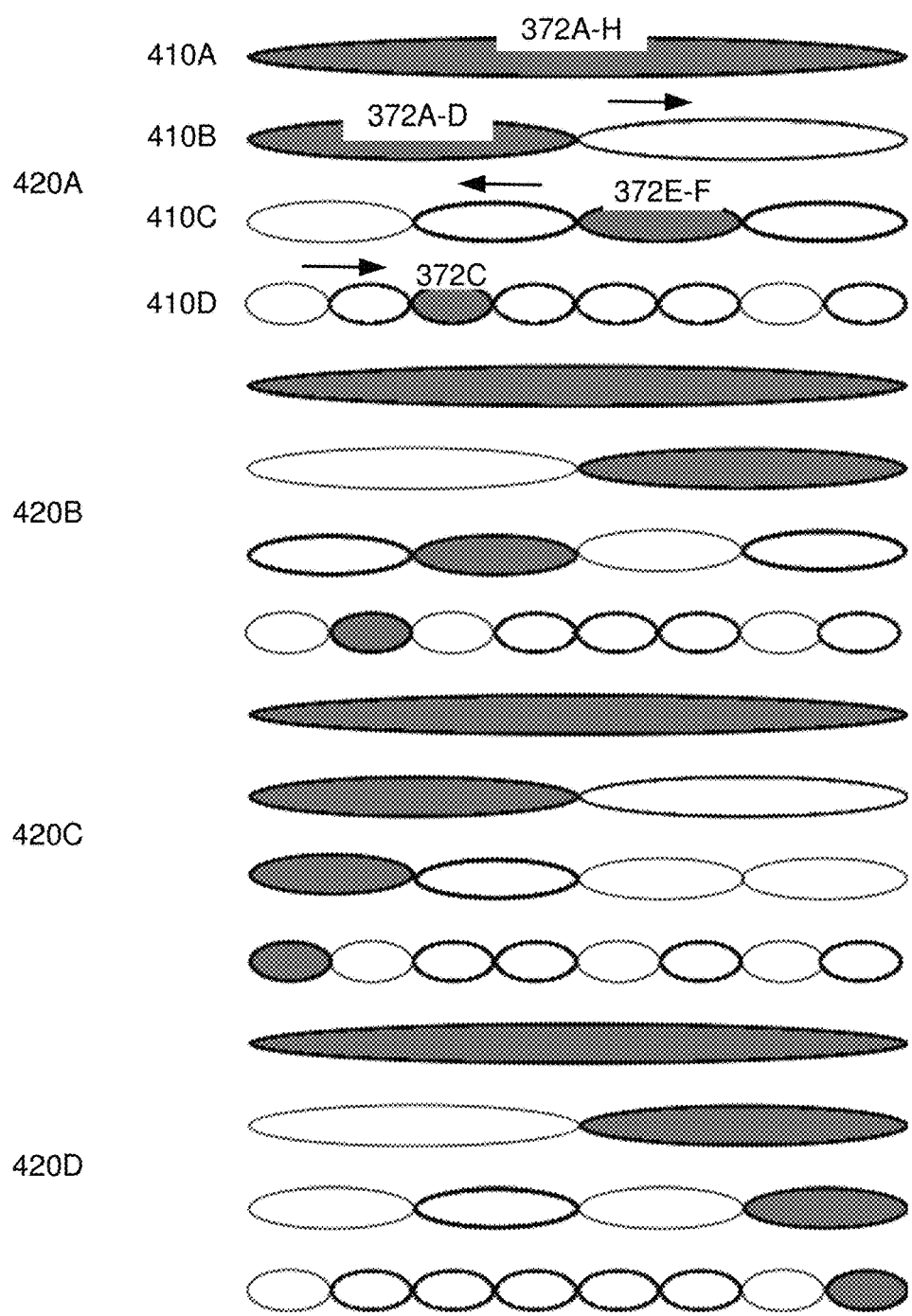
FIGS. 4A-4B depict a diagram of a non-limiting example sequence of dynamic beamforming layers that can facilitate the use of multiple layers of beamformed signals.
Figure 4B:
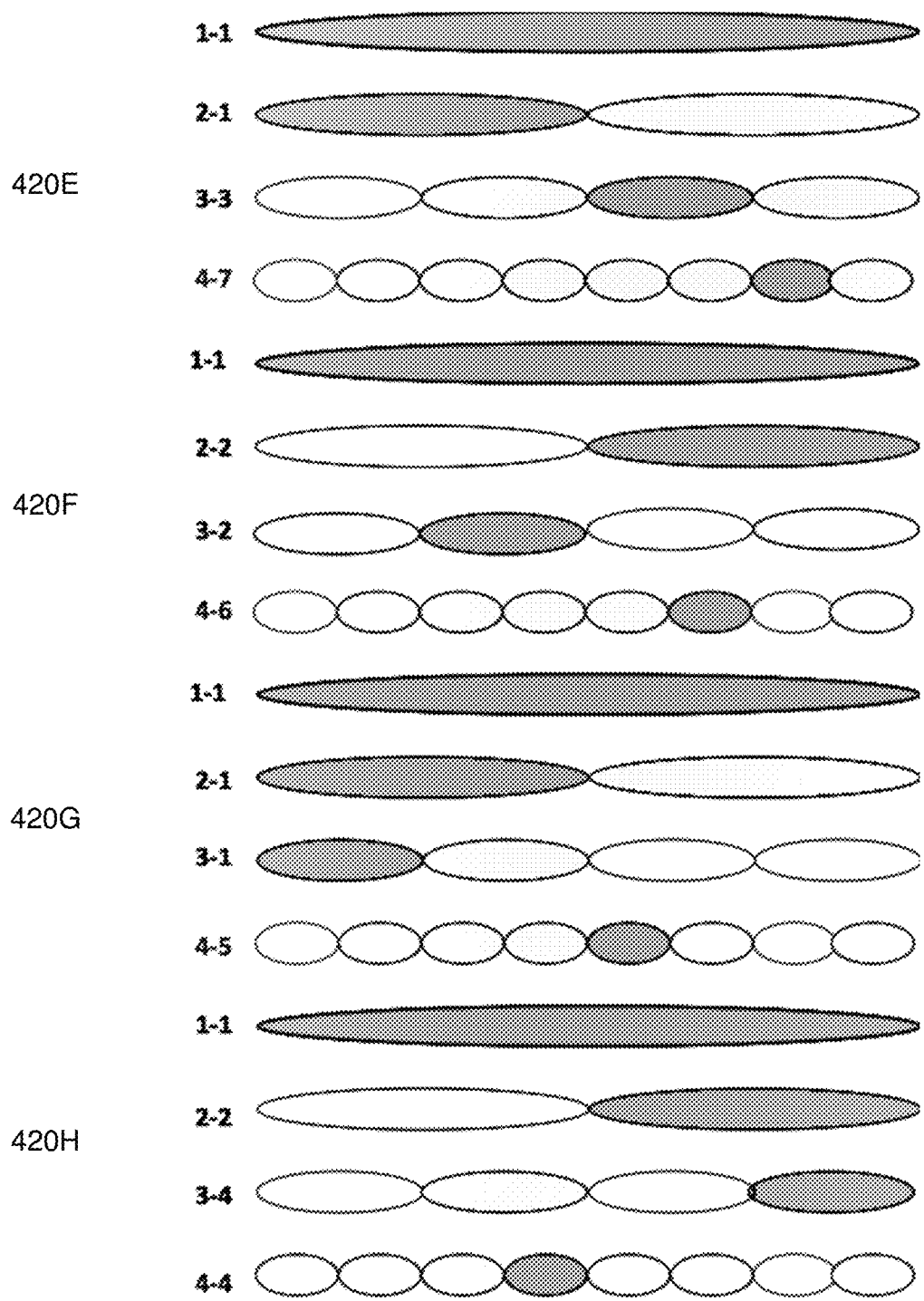

FIGS. 4A-4B depict a diagram of a non-limiting example sequence of dynamic beamforming layers 400 that can facilitate the use of multiple layers of beamformed signals. For purposes of brevity, description of like elements and/or processes employed in other embodiments is omitted. In example sequence 400, the example four layers of FIG. 3 are depicted with a sequence of activation for combinations of beam directions 372A-H, e.g., with layers 410A-D sequentially activated for an example four cycles 420A-H. As described further below, each oval shown in FIGS. 4A-4B can include one or more beam directions 372A-H.

Having defined multiple layers of beamformed signals from beamforming antenna equipment 155, one or more embodiments of beamform directing component 122 a beamform sequence component 124 can dynamically change the beamformed signals from different layers for use at different times and for different purposes. In an example embodiment, as depicted in FIG. 4, layers 410A-H can be incrementally activated and used in sequence, with a selected direction from the directions being activated each time the layers are activated. For example, for cycle 420A, layers 410A-D are activated and deactivated in sequence, with the activation of each layer in each of cycles 420A-H causing a sequential activation beamformed signaling for the combinations of beam directions 372A-H for each of layers 410A-D. This is shown in FIG. 4, with beam directions 410A-H, 372A-D, 372E-F, and 372C having beamformed signals respectively activated. It should be noted that, for the full set of cycles to be utilized for layer 410D, eight cycles (e.g., one for each of beam directions 372A-H to be activated.

It is noted that, the sequences of directions discussed above is non-limiting, and different implementations can have different starting layers and beamforming directions, and layers 410A-D can activate beamforming directions in any sequence, e.g., for cycles 420A, layer 410B begins the sequence at beam direction 372A, while layer 410C begins at 372E-F, and layer 410D begins at beam direction 372C. In addition, as depicted, sequences of directions can by cycled differently for different layers, e.g., layers 410B and 410D increment upwards and layer 410C increments through different combinations of directions in a reverse order.

a second beamformed signal directed by the beamforming antenna equipment 155 according to a second direction 172B of the group of different directions 172A-F, wherein the second direction was selected based on a sequence of directions, and wherein transmitting of beamformed signals to respective ones of the group of different directions based on the sequence of directions facilitates establishment of wireless coverage by at least some of the base station equipment for a corresponding geographic area.

Figure 5:
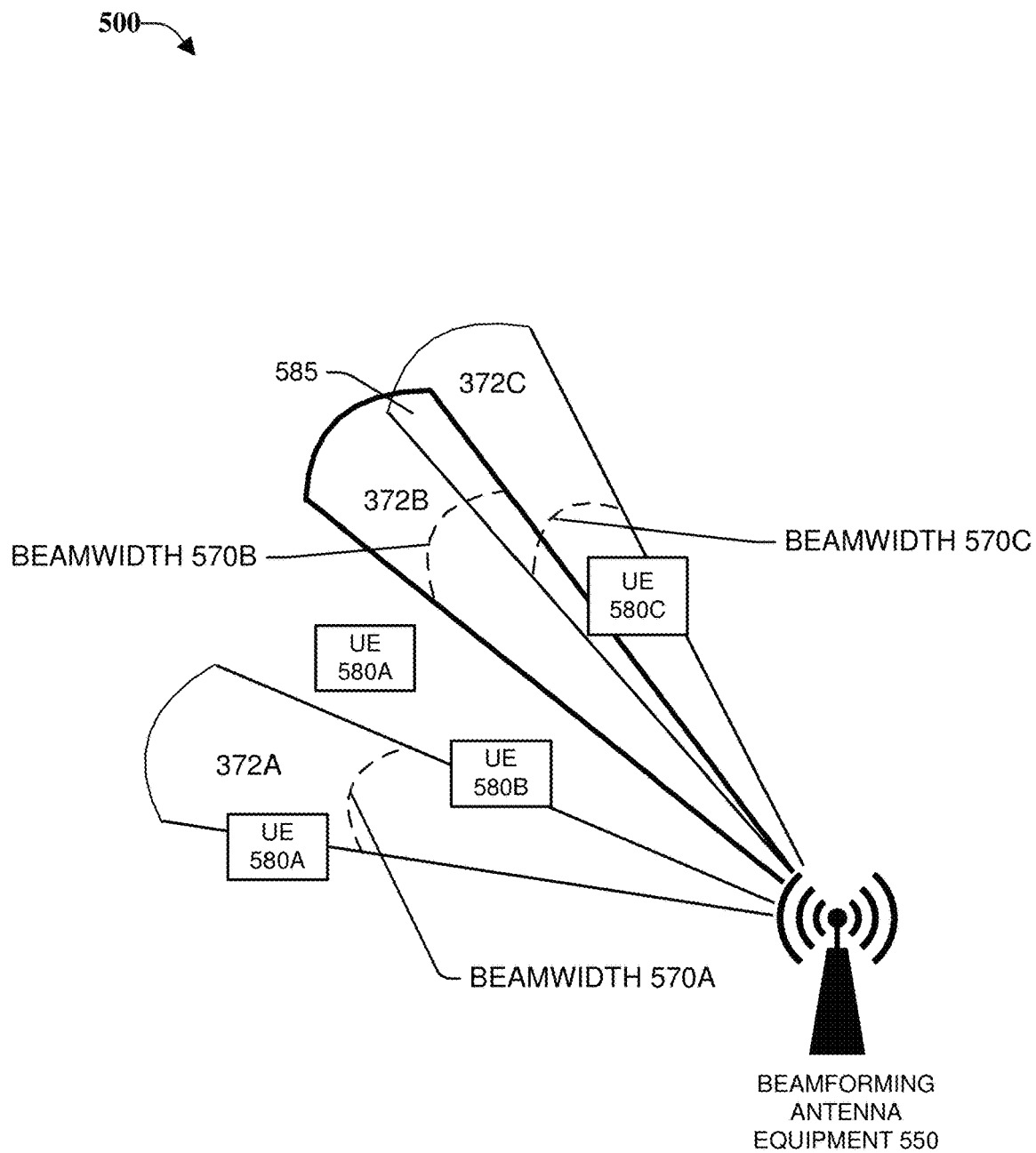
FIG. 5 is a diagram of a non-limiting example system that can facilitate using dynamically layered beamformed signals for establishing wireless connections with network equipment, in accordance with one or more embodiments.

FIG. 5 is a diagram of a non-limiting example system 500 that can facilitate using dynamically layered beamformed signals for establishing wireless connections with network equipment, in accordance with one or more embodiments. For purposes of brevity, description of like elements and/or processes employed in other embodiments is omitted. As depicted, system 500 includes beamforming antenna equipment 550, with beams directed towards beam directions 372A-C variously intersecting UEs 580A-C. Beamwidth 570 of beamformed signals from beam direction 372A is labeled along with beam overlap 585 of beams toward beam directions 372B-C.

In contrast to fixed/static broadcast control beams, one or more embodiments can implement different types of broadcast/control beam shapes that can be dynamically adjusted to support different morphologies, cell sizes, and site types. One adjustment that is facilitated by one or more embodiments is the adjustment of beamformed signals from beam directions 570B-C of beam directions 372B-C.

As noted above, in one or more embodiments, wireless coverage component 134 can, in accordance with one or more embodiments, transmit a first beamformed signal to beam direction 372B until the expiration of a time interval, with the transmitting of second beamformed signal to beam direction 372C commencing in response to the expiration of the time interval. In an example, wireless coverage component 134 can, in accordance with one or more embodiments, transmit a first beam towards beam direction 372B until the expiration of a time interval (e.g., time (t) until t+1 seconds), with the transmitting of second beam towards beam direction 372C commencing in response to the expiration of the time interval, e.g., t+1 until t+2 seconds. It should be noted that, in one or more embodiments, different time intervals can be selected and adjusted for each transition in the sequence of the beamformed signals, e.g., one interval from towards beam directions 372A to 372B, and another from 372B to 372C.

One having skill in the relevant art(s), given the description herein, appreciates that the coverage of beams to beam directions 372A-C can be controlled by different beamforming principles. It should be noted that, in the implementation depicted in FIG. 3, beams toward beam directions 372A and 372B are shown as not overlapping in coverage, while beams directed towards beam directions 372B and 372C are shown as having potential beam overlap 585, e.g., if both beams are active simultaneously then the beamformed signals could overlap each other, causing interference in some circumstances. If, as in some embodiments, implementation parameters are set such that the beams are not active simultaneously, then the beams would not interfere with each other. Thus, in the example described above, because second beamformed signal towards beam direction 372C commences upon the expiration of a time interval (t+1) (and the ending of the transmission of first beamformed signal) beam overlap 585 does not occur and interference between first beamformed signal to beam direction 372B and second beamformed signal to beam direction 372C is avoided.

In another example, beamformed signal to beam direction 372C can be set to be activated at a time earlier than the expiration of the first interval, e.g., t+0.75. In this example, interference from beam overlap 585 can occur, with interference between the signals. Beam overlap 585 can also provide an enhanced wireless coverage area, with a reduction in a likelihood that ones of UE 580A-C will not be able to detect beamformed signals from beam directions 372A-C, e.g., because of avoiding gaps in the coverage such as with UE 580A. Because of the position of UE 580C in beam overlap 585, this device can be is an example of a device that can benefit from beam overlap, e.g., by being able to detect a control beam (e.g., beamformed signal to beam direction 372B) at an earlier time, compared to an example where the beamformed signal towards beam direction 372C includes UE 580C, but is positioned without beam overlap 585 of beamformed signal to beam direction 372B.

Based at least on these examples, and examples suggested to one having skill in the relevant art(s) therefrom, one or more embodiments can include implementation parameters that are based on benefit of a lower time for identification and larger coverage are for UEs 580A-C, compared to the benefits of this reduction of interference between beamformed signals from beam directions 372B-C. Stated differently, in this example approach, the extent of the overlapping can be based on setting characteristics of the wireless coverage in a particular geographic area, e.g., a maximum interference value characteristic and a maximum area of missing coverage characteristic between a first beamformed signal and a second beamformed signal in the corresponding geographic area can be set, e.g., beamformed signals from beam directions 372B-C.

In additional embodiments, wireless coverage component 134 can also dynamically adjust the beamwidth of beamformed signals from beam directions 372A-C based on different factors, including, but not limited to, the number of dynamic layers in a cycle, and the considerations of interference and coverage discussed above with the discussion of beam overlap 585. For example, referring back to FIG. 4A, with the cycling between layers 410A-D in the implementation depicted, in some implementations, to maintain coverage of the area of layer 410C (e.g., with beamformed signals having a width that covers two of beam directions 372A-H) when activating layer 410D (e.g., with beamformed signals having a width that covers one of beam directions 372A-H), the beamwidth of beam signals can be narrowed when transitioning from cycle 410C to 410D. This reduction is depicted with the labeled beamformed signals having a width covering beam directions 372E-F in cycle 410C and beamformed signals covering beam directions 372C in cycle 410D.

In another example, different parameters of embodiments described and suggested above (e.g., number of beam layers, beamwidths, transition interval length, and others) can be selected to change an additional characteristic of the wireless coverage provided by beamforming antenna equipment 550, e.g., the quantity of power required to provide control beam coverage to the geographic area covered. In one or more embodiments, by dividing up the coverage into areas covered by dynamically layered beamformed signals, the total amount of power required to serve the geographic area is reduced, e.g., because only a portion of the area is covered at the same time.

FIG. 6 is a non-limiting example of computer program code 600 that can be used to implement one or more embodiments described herein. For purposes of brevity, description of like elements and/or processes employed in other embodiments is omitted.

An example of an implementation using computer program code 600 is the example diagram of a pattern of layered beamformed signals depicted in FIGS. 4A-4B. As depicted, loop 620 continues for each of a number of control layers 610. During loop 620, beam position 615 is incremented for the control layers similar to the incrementation approach described with FIGS. 4A-4B above.

Further features of program code 600 include adjustments to beamwidth based on which of the cycles of control layers is active, e.g., such as the example of cycles 410C-D discussed with FIG. 5 above.

Figure 7:
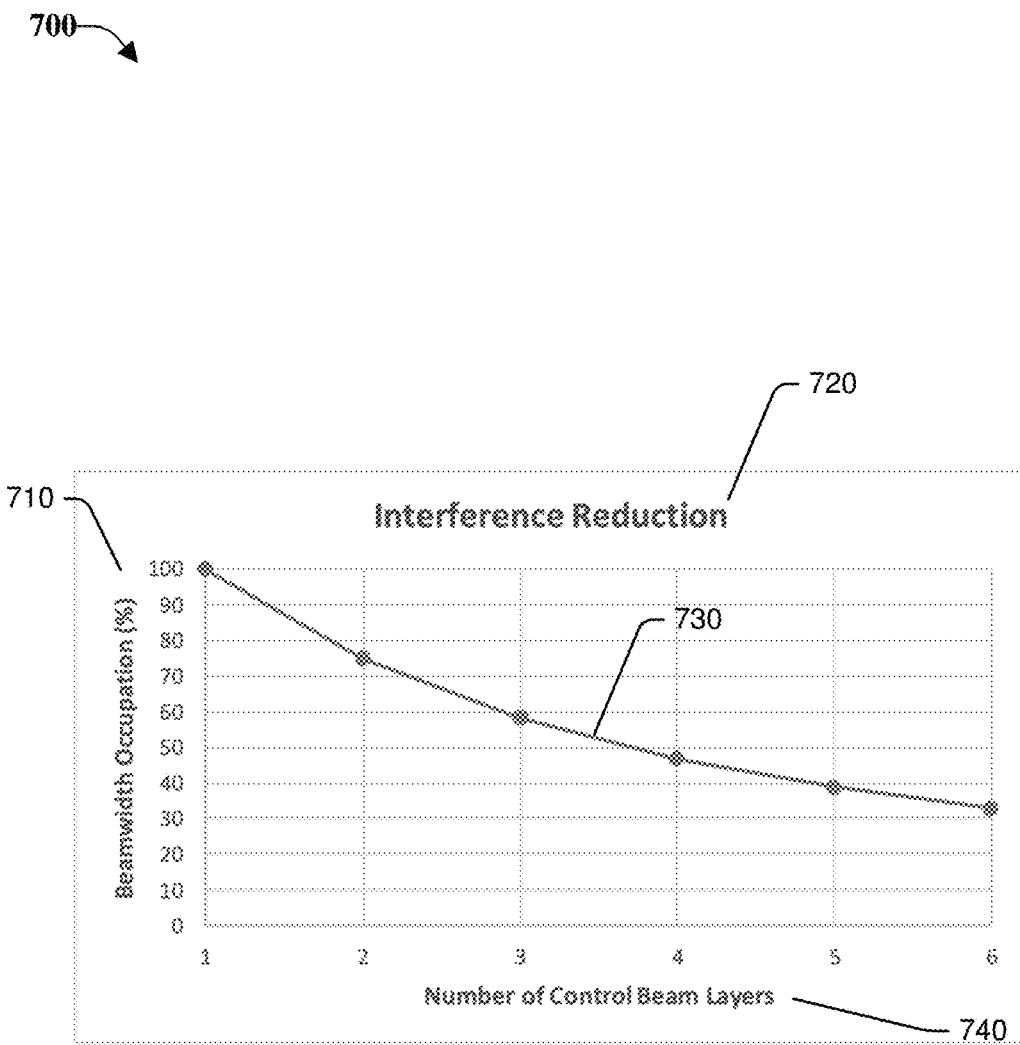
FIG. 7 is a non-limiting chart that illustrates example effects upon interference between user equipment when one or more embodiments are deployed with increasing numbers of control layers.

FIG. 7 is a non-limiting chart 700 that illustrates example effects upon interference between user equipment when one or more embodiments are deployed with increasing numbers of control layers. Chart 700 depicts interference reduction 720 measured by beamwidth occupation 710, compared 730 to example numbers of control layers 740. As noted above, by providing sequenced separate beamformed control beams, one or more embodiments can reduce bandwidth occupation in some circumstances.

Figure 8:
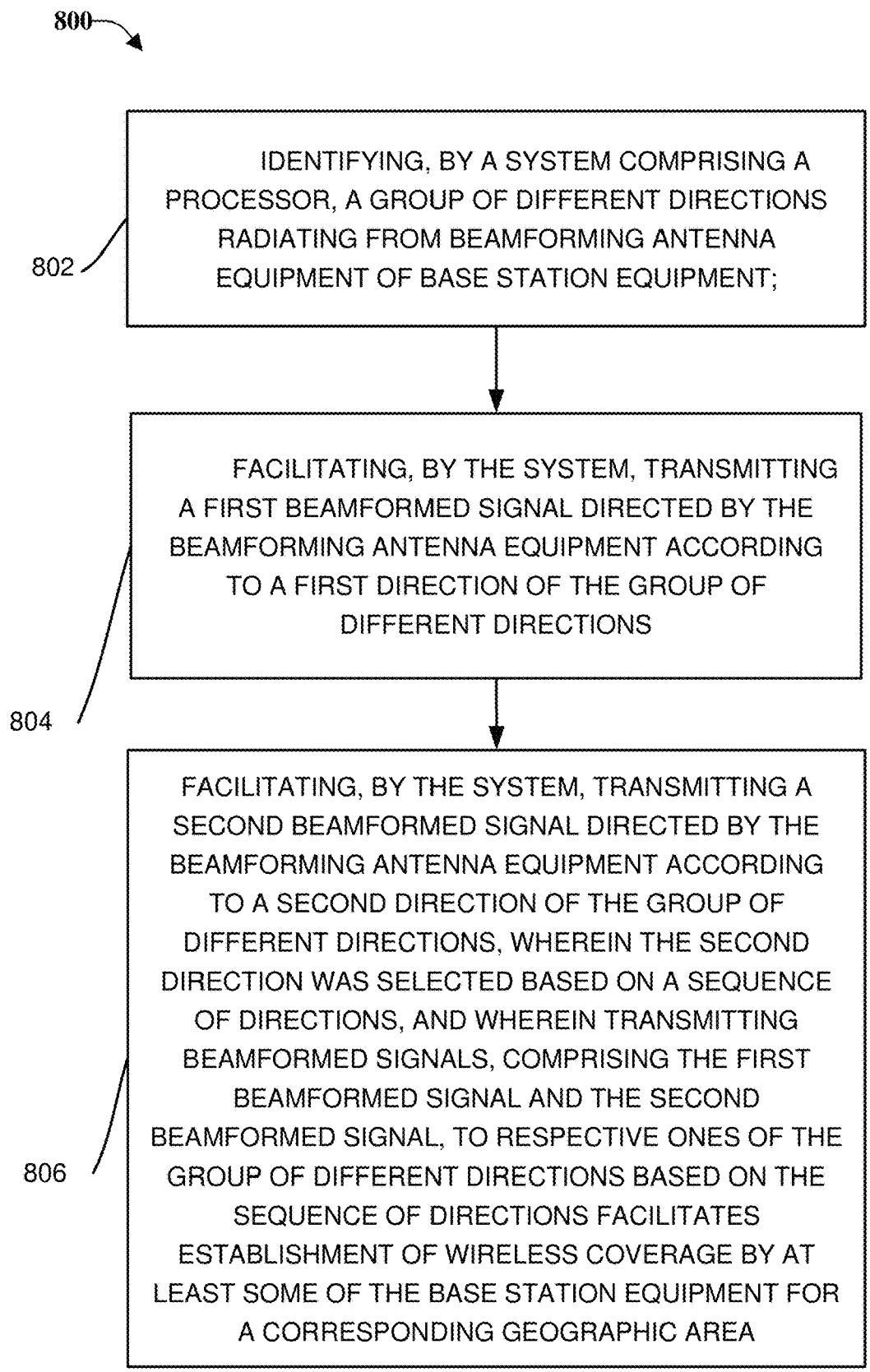
FIG. 8 depicts a system where one or more functions can facilitate using dynamically layered beamformed signals for establishing wireless connections with network equipment, in accordance with one or more embodiments described above.

FIG. 8 illustrates an example method 800 that can facilitate using dynamically layered beamformed signals for establishing wireless connections with network equipment, in accordance with one or more embodiments. For purposes of brevity, description of like elements and/or processes employed in other embodiments is omitted.

In one or more embodiments, method 800 can include identifying, by a system comprising a processor, a group of different directions radiating from beamforming antenna equipment of base station equipment. In one or more embodiments, method 800 can further include facilitating, by the system, transmitting a first beamformed signal directed by the beamforming antenna equipment according to a first direction of the group of different directions.

In one or more embodiments, method 800 can further include, facilitating, by the system, transmitting a second beamformed signal directed by the beamforming antenna equipment according to a second direction of the group of different directions, wherein the second direction was selected based on a sequence of directions, and wherein transmitting beamformed signals, comprising the first beamformed signal and the second beamformed signal, to respective ones of the group of different directions based on the sequence of directions facilitates establishment of wireless coverage by at least some of the base station equipment for a corresponding geographic area.

Figure 9:
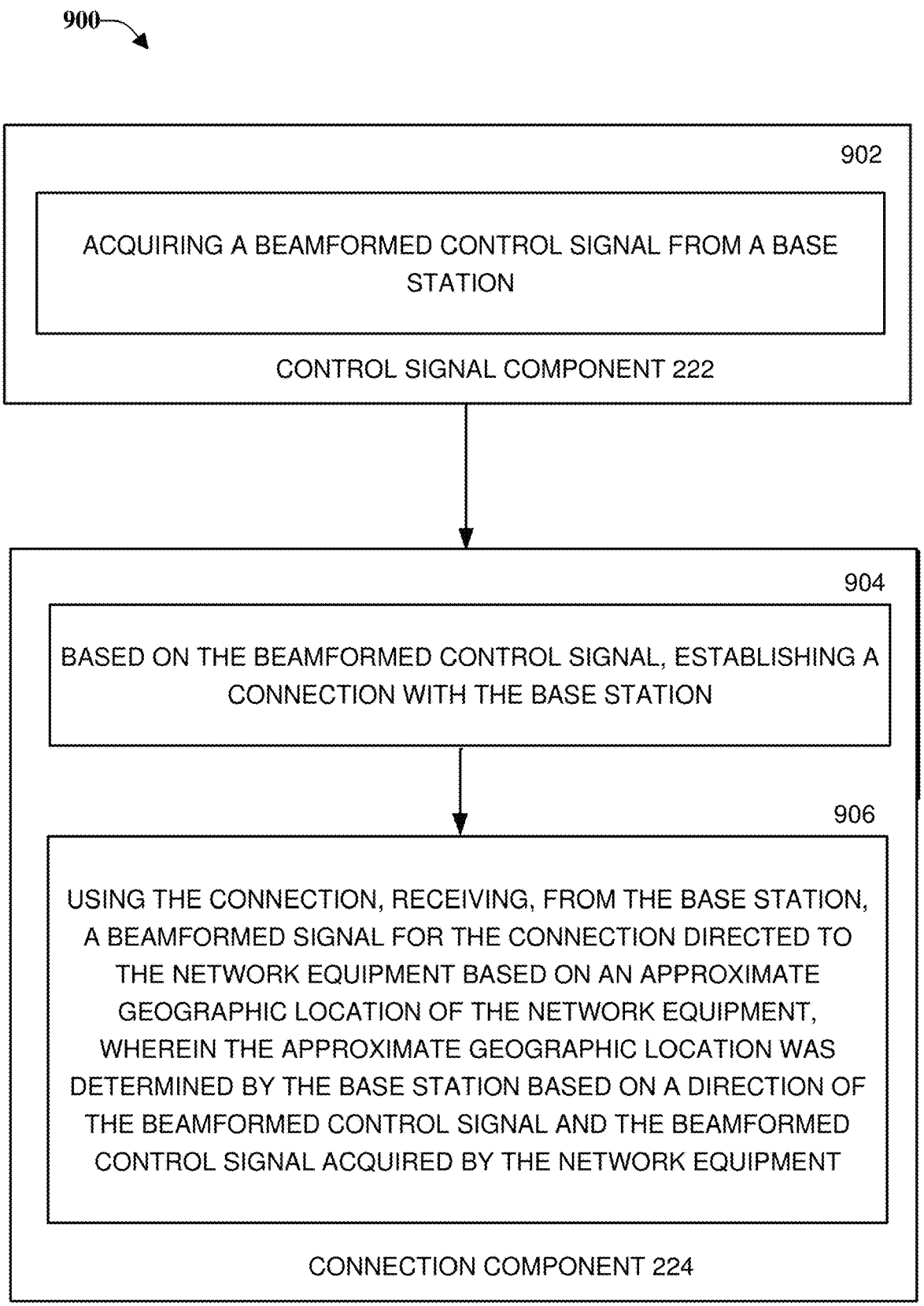
FIG. 9 illustrates an example method that can facilitate using dynamically layered beamformed signals for establishing wireless connections with network equipment, in accordance with one or more embodiments.

FIG. 9 depicts a system 900 where one or more functions of user equipment 180A described above can be implemented, in accordance with one or more embodiments described above. For purposes of brevity, description of like elements and/or processes employed in other embodiments is omitted. In one or more embodiments, user equipment 180A can be implemented in a software platform that includes several interconnected components. As depicted, system 900 includes control signal component 222, connection component 224, and other components described or suggested by different embodiments described herein.

In one or more embodiments, control signal component 222 can include a function 902 that can acquire a beamformed control signal from a base station. In additional embodiments, connection component 224 can include a function 904 that can, based on the beamformed control signal, establish a connection with the base station. In embodiments, connection component 224 can further include function 906 that can, using the connection, receive, from the base station, a beamformed signal for the connection directed to the network equipment based on an approximate geographic location of the network equipment, with the approximate geographic location being determined by the base station based on a direction of the beamformed control signal and the beamformed control signal acquired by the network equipment.

Figure 10:
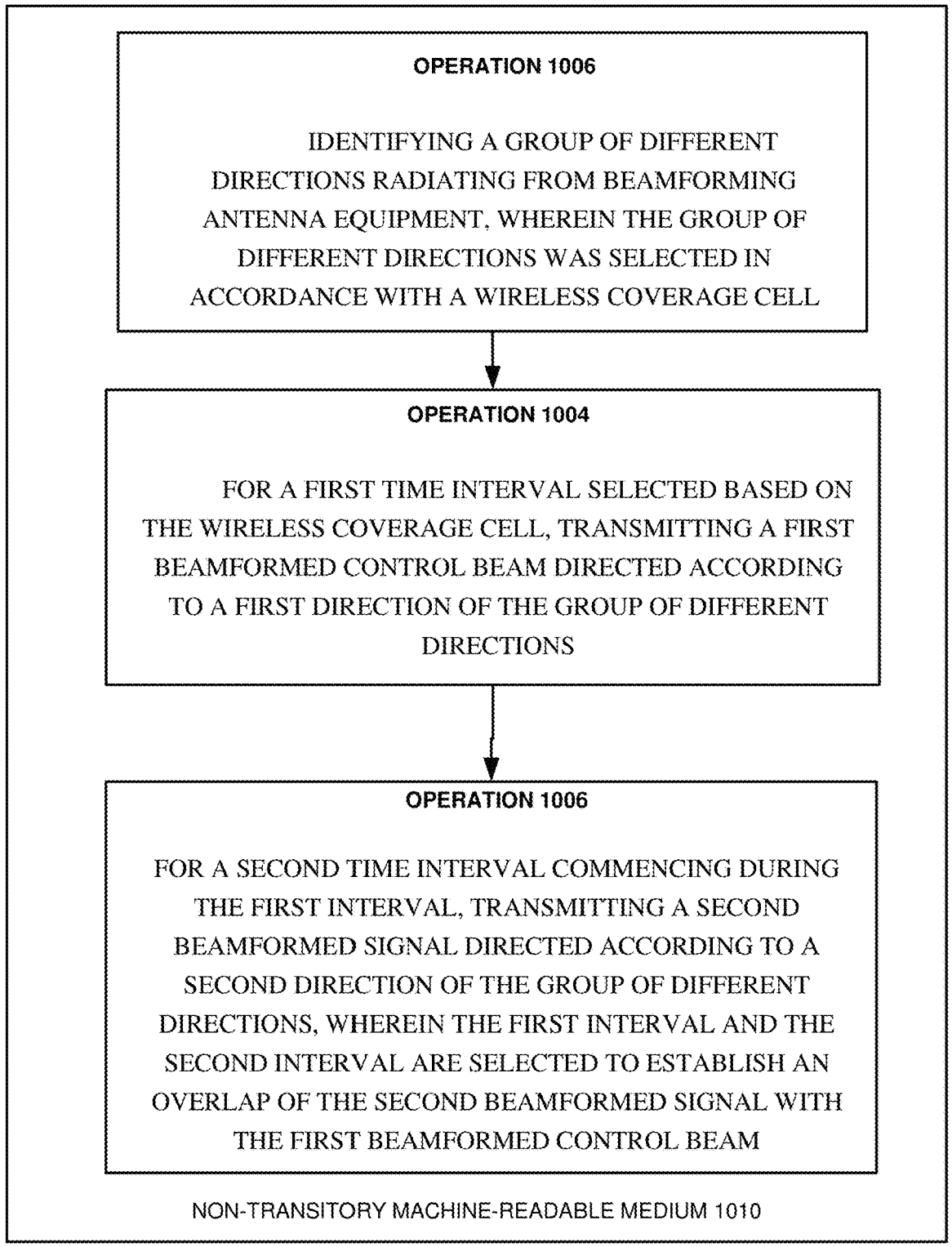
FIG. 10 depicts an example non-transitory machine-readable medium that can include executable instructions that, when executed by a processor of a system, can facilitate using dynamically layered beamformed signals for establishing wireless connections with network equipment, in accordance with one or more embodiments described above.

FIG. 10 depicts an example 1000 non-transitory machine-readable medium 1010 that can include executable instructions that, when executed by a processor of a system, facilitate enabling using dynamically layered beamformed signals for establishing wireless connections with network equipment, in accordance with one or more embodiments described above. For purposes of brevity, description of like elements and/or processes employed in other embodiments is omitted. As depicted, non-transitory machine-readable medium 1010 includes executable instructions that can facilitate performance of operations 1002-1006.

In one or more embodiments, the operations can include operation 1202 that can identify a group of different directions radiating from beamforming antenna equipment, wherein the group of different directions was selected in accordance with a wireless coverage cell. The instructions further include operation 1204 that can, for a first time interval selected based on the wireless coverage cell, transmit a first beamformed control beam directed according to a first direction of the group of different directions.

In yet another instruction, operation 1204 can, for a second time interval commencing during the first interval, transmit a second beamformed signal directed according to a second direction of the group of different directions, wherein the first interval and the second interval are selected to establish an overlap of the second beamformed signal with the first beamformed control beam.

Figure 11:
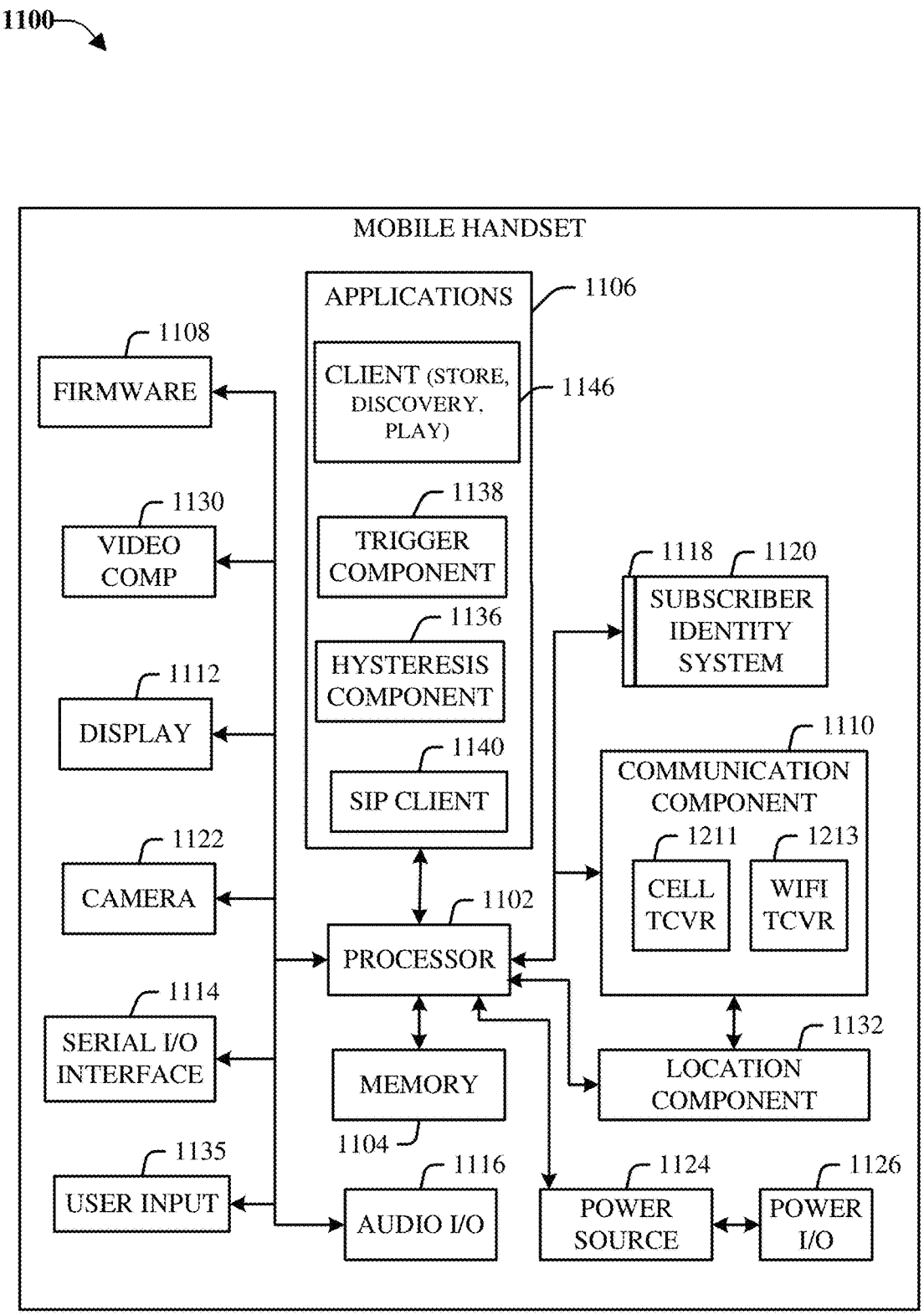
FIG. 11 illustrates an example block diagram of an example mobile handset operable to engage in a system architecture that can facilitate processes described herein, in accordance with one or more embodiments.

FIG. 11 illustrates an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1113 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

FIG. 14 provides additional context for various embodiments described herein, intended to provide a brief, general description of a suitable operating environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 12:
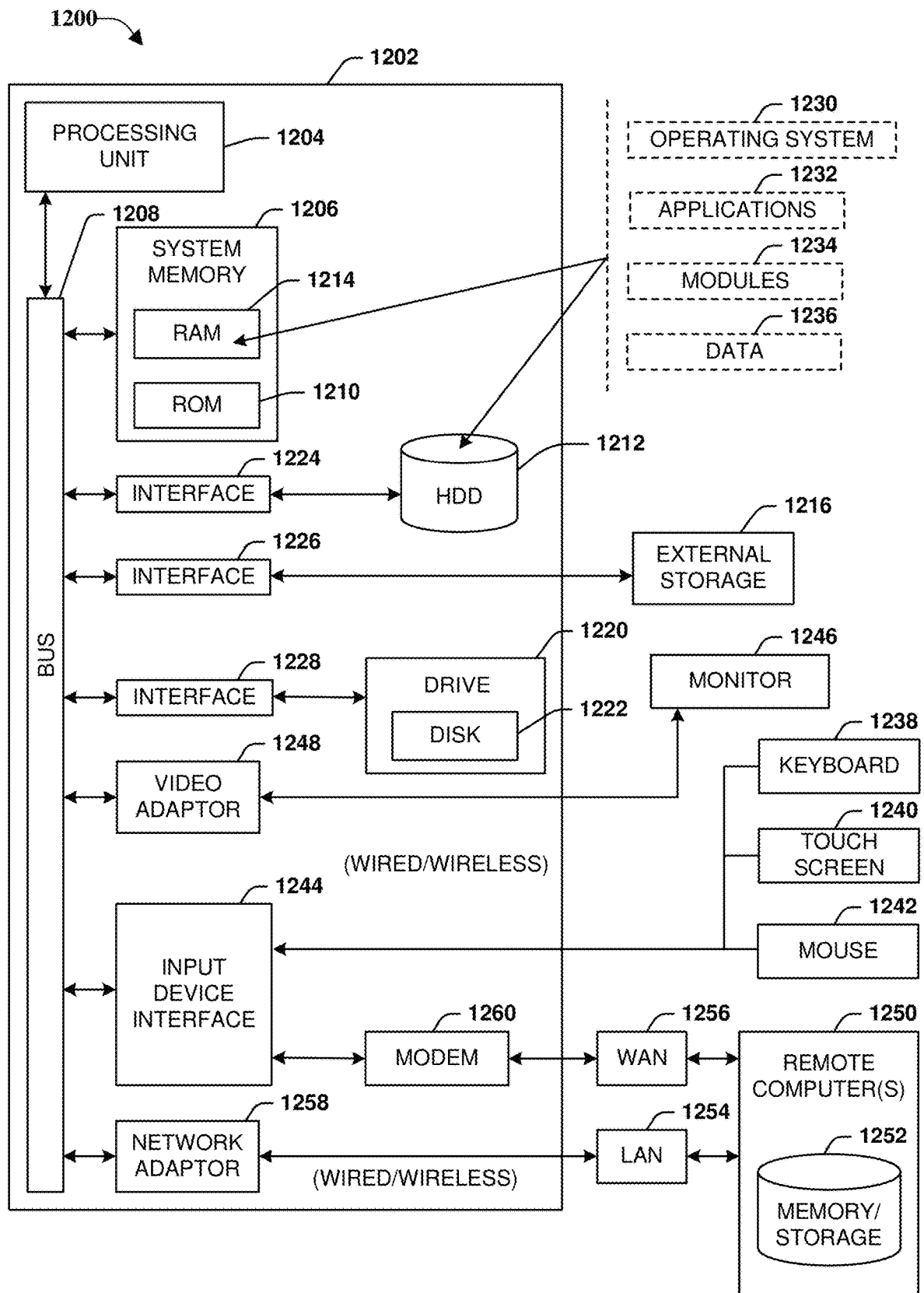
FIG. 12 illustrates an example block diagram of an example computer operable to engage in a system architecture that can facilitate processes described herein, in accordance with one or more embodiments.

FIG. 12 depicts an example operating environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1214 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid-state drive, an optical disk drive, which can read or write from a disk 1222, such as a CD-ROM disc, a DVD, a BD, etc. Alternatively, where a solid-state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB), ROM base address (RBA), and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE) or 5G; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. Network equipment, comprising:
a processor; and
a memory that stores executable instructions that, when executed by the processor, facilitate performance of operations, comprising:
identifying a group of different directions radiating from antenna equipment of base station equipment;
selecting a first width of a first signal to facilitate establishment of wireless coverage by at least some of the base station equipment;
transmitting the first signal, as directed by the antenna equipment, according to a first direction of the group of different directions; and
transmitting a second signal, as directed by the antenna equipment, according to a second direction of the group of different directions, wherein the second direction was selected based on a sequence of directions, and wherein transmitting signals, comprising the first signal and the second signal, to respective ones of the group of different directions based on the sequence of directions further facilitates the establishment of the wireless coverage by the at least some of the base station equipment for a corresponding geographic area.

2. The network equipment of claim 1, wherein the antenna equipment comprises beamforming antenna equipment, wherein the width comprises a beamwidth, and wherein the first signal comprises a beamformed signal.

3. The network equipment of claim 1, wherein the first signal comprises a first broadcast control beam, and wherein the operations further comprise:
receiving a confirmation signal corresponding to a confirmation that the user equipment acquired the first broadcast control beam; and
based on the first direction, determining an approximate geographic location of the user equipment in relation to the base station equipment.

4. The network equipment of claim 3, wherein the operations further comprise, based on the approximate geographic location, sending a specified signal directed to the user equipment.

5. The network equipment of claim 1, wherein the sequence of directions comprises a pattern of directions radiating around the base station equipment in a circular pattern.

6. The network equipment of claim 1, wherein the transmitting of the first signal is performed until expiration of a time interval, and wherein the transmitting of the second signal commences in response to the expiration of the time interval.

7. The network equipment of claim 1, wherein selecting the first width is further based on the establishment of the wireless coverage for the corresponding geographic area.

8. The network equipment of claim 7, wherein the first width is selected further based on an overlapping in the corresponding geographic area of the second signal by the first signal.

9. The network equipment of claim 8, wherein an extent of the overlapping is based on a maximum interference value and a maximum area of missing coverage between the first signal and the second signal in the corresponding geographic area.

10. The network equipment of claim 1, wherein the operations further comprise, based on a change to a first quantity of directions comprised in the group of different directions, changing a characteristic of the wireless coverage for the corresponding geographic area.

11. The network equipment of claim 10, wherein the characteristic comprises a second quantity of signal interference within the wireless coverage for the corresponding geographic area.

12. The network equipment of claim 10, wherein the characteristic comprises a second quantity of power applicable to the at least some of the base station equipment to facilitate the establishment of the wireless coverage for the corresponding geographic area.

13. A method, comprising:
acquiring, by a network device comprising a processor, a beamformed control signal from a base station,
based on the beamformed control signal, facilitating, by the network device, establishing a connection with the base station, and
using the connection, receiving, by the network device, from the base station, a beamformed signal for the connection directed to the network device based on an approximate geographic location of the network device, wherein the approximate geographic location was determined by the base station based on a direction of the beamformed signal and the beamformed control signal acquired by the network device, and wherein the beamformed control signal comprises a beamwidth that was selected by the base station to facilitate establishment of wireless coverage by the base station.

14. The method of claim 13, wherein the direction is comprised in a group of directions radiating from the base station, wherein the beamformed control signal is comprised in a group of beamformed control signals directed by the base station to directions of the group of directions, and wherein the group of directions is selected to facilitate the establishment of the wireless coverage by the base station for the geographic area.

15. The method of claim 14, wherein signals of the group of beamformed control signals are serially directed to the directions of the group of directions in accordance with a sequence of directions, to facilitate the establishment of the wireless coverage.

16. The method of claim 15, wherein the signals of the group of beamformed control signals are serially directed for a time interval selected in accordance with a parameter associated with the wireless coverage.

17. A non-transitory machine-readable medium, comprising executable instructions that, when executed by a processor of network equipment, facilitate performance of operations, comprising:
acquiring a control signal from a base station,
based on the control signal, establishing a connection with the base station, and
using the connection, receiving, from the base station, a beamformed signal for the connection directed to the network equipment based on an approximate geographic location of the network equipment, wherein the approximate geographic location was determined by the base station based on a direction of the beamformed signal and the control signal acquired by the network equipment, and wherein the control signal comprises a beamwidth that was selected by the base station to facilitate establishment of wireless coverage by the base station.

18. The non-transitory machine-readable medium of claim 17, wherein the direction is comprised in a group of directions radiating from the base station, wherein the control signal is comprised in a group of beamformed control signals directed by the base station to directions of the group of directions, and wherein the group of directions is selected to facilitate the establishment of the wireless coverage by the base station for the geographic area.

19. The non-transitory machine-readable medium of claim 18, wherein signals of the group of beamformed control signals are serially directed to the directions of the group of directions in accordance with a sequence of directions, to facilitate the establishment of the wireless coverage.

20. The non-transitory machine-readable medium of claim 19, wherein the signals of the group of beamformed control signals are serially directed for a time interval selected in accordance with a parameter associated with the wireless coverage.

* * * * *